June 10, 1947.　　E. I. ANDERSON ET AL　　2,422,064
GROUND SPEED INDICATOR
Filed Oct. 26, 1943　　2 Sheets-Sheet 1

Inventor
EARL I. ANDERSON
& ALLEN BARCO
By
Attorney

June 10, 1947. E. I. ANDERSON ET AL 2,422,064
GROUND SPEED INDICATOR
Filed Oct. 26, 1943 2 Sheets-Sheet 2

Inventor
EARL I. ANDERSON
& ALLEN BARCO
Attorney

Patented June 10, 1947

2,422,064

UNITED STATES PATENT OFFICE 2,422,064

GROUND SPEED INDICATOR

Earl I. Anderson, Manhasset, and Allen Barco, Jackson Heights, N. Y., assignors to Radio Corporation of America, a corporation of Delaware Application October 26, 1943, Serial No. 507,740

5 Claims. (Cl. 250—1.56)

Our invention relates to systems for determining the relative speeds of objects and particularly to a system in which the Doppler effect is utilized for obtaining the speed or drift of an aircraft with respect to the earth.

A system of the above-mentioned type is described and claimed in a copending application Serial No. 352,845, filed August 16, 1940, in the name of Irving Wolff, and entitled Drift indicators. The present invention is an improvement on the system described in the Wolff application.

One object of the invention is to provide an improved receiver for a speed indicator system wherein radio waves are transmitted in different directions, received from these directions after reflection, and then reduced in frequency and beat with each other to determine the Doppler frequency.

Another object of the invention is to provide an improved method of and means for heterodyning two high frequency signals differing only slightly in frequency to reduce their frequencies to comparatively low frequencies that still have the original frequency difference.

In one preferred embodiment of the invention pulses of radio energy are radiated toward the earth forwardly and rearwardly from an aircraft, and the pulses reflected from the earth at the front and at the rear of the aircraft are supplied to separate detectors where they are heterodyned to a lower frequency by means of a single oscillator which is common to the two detectors. In order to prevent the reflected signals from mixing and heterodyning with each other at this point in the circuit, the oscillator is of a type having tuned plate and grid circuits, the plate circuit being coupled to one detector and the grid circuit being coupled to the other detector. Since the oscillator plate and grid circuits are substantially isolated from each other and are resonant at frequencies substantially different from the signal frequency, the signal from one detector will not be fed through the common oscillator to the other detector in sufficient amplitude to produce undesired beats.

Figure 1:
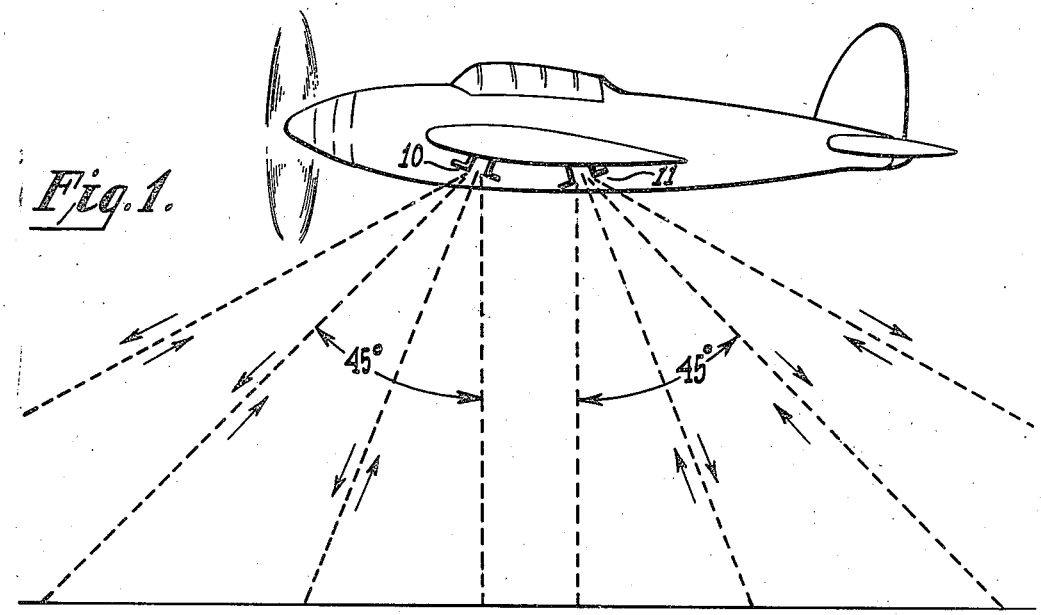
Figure 3:
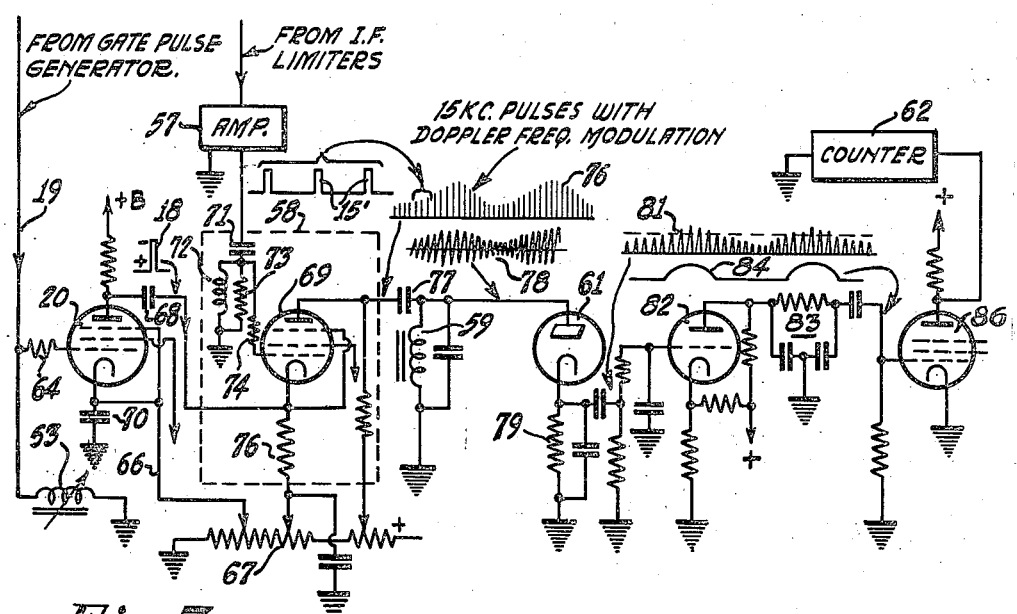
Figure 2:
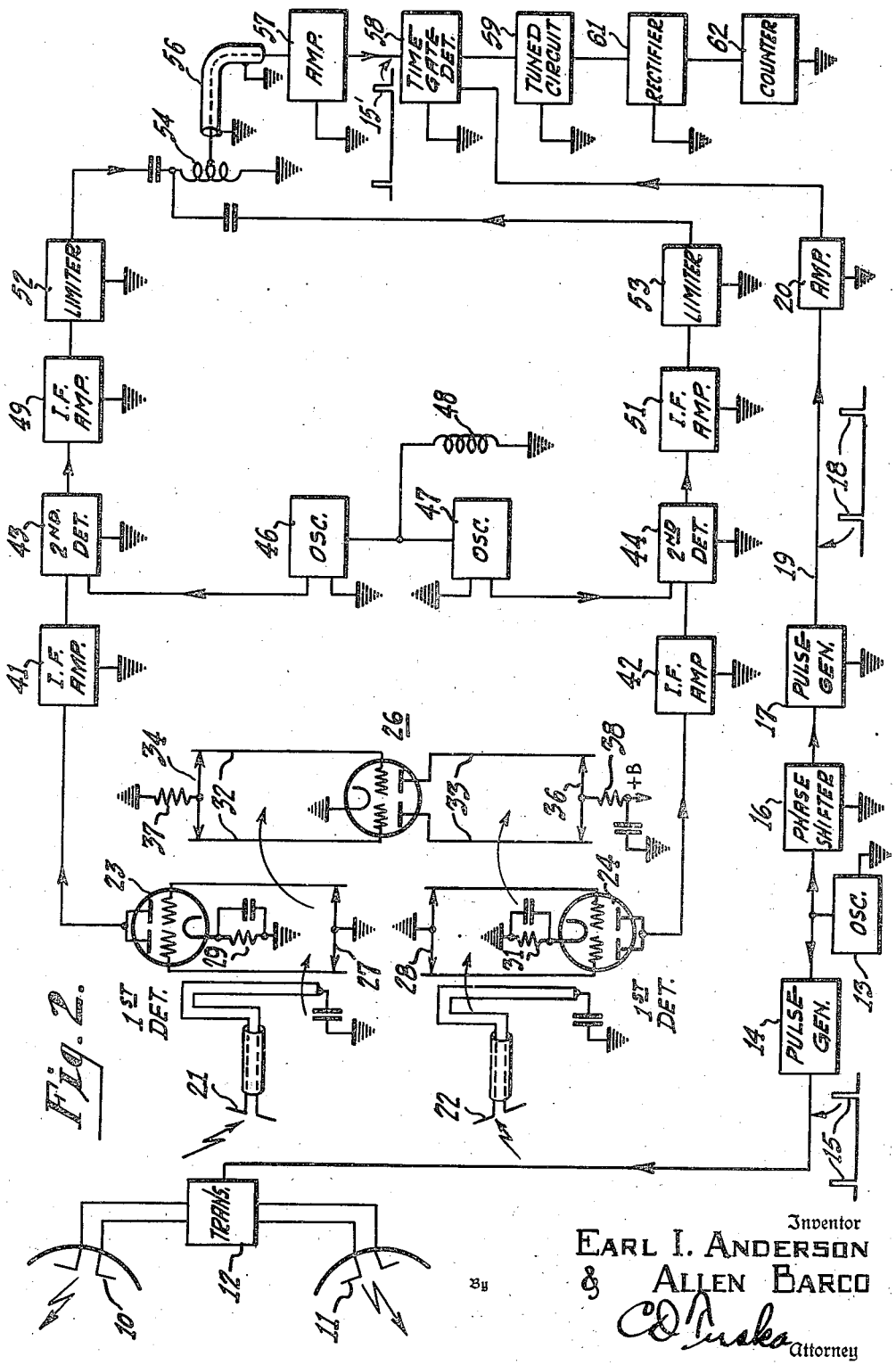

The invention will be better understood from the following description taken in connection with the accompanying drawing in which Figure 1 is a side view of an airplane showing how radio waves are transmitted towards the earth in a system embodying the invention, Figure 2 is a circuit and block diagram of a system embodying the invention, and Figure 3 is a circuit diagram of a portion of the system shown in block diagram in Fig. 2. In the several figures like parts are indicated by similar reference characters.

In Fig. 1, radio pulses are radiated forwardly and downwardly from a directive antenna 10 and similar pulses are radiated rearwardly and downwardly from a directive antenna 11. The reflected pulses may be received by the same antennas 10 and 11 by utilizing suitable means for short-circuiting the lines to the receivers during the instant of pulse transmission. Such antenna duplexing means comprising spark gaps or glow tubes are well known in the art. In the example to be described, however, the use of separate receiving antennas will be assumed.

As will be explained hereinafter, only the pulses reflected from preselected points such as those 45 degrees ahead and behind the airplane are passed to the indicating circuits and utilized in measuring the Doppler effect, this directional selection being accomplished by the use of "gating" pulses as described in the above-identified Wolff application. It may be noted that such gating is desirable because it is difficult to provide antennas that are suitable for installation on aircraft and which have a sufficiently narrow radiation pattern.

Referring to Fig. 2, the antennas 10 and 11 (which are shown as dipoles in parabolic reflectors merely by way of example) are supplied with short pulses of high frequency radio energy from a transmitter 12. Such pulses may have a carrier frequency of 400 megacycles, a duration of about 0.3 microsecond, and a repetition rate of 15,000 per second. These pulses of high frequency energy are obtained by means of a 15,000 cycle sine wave oscillator 13 which is coupled to a pulse generator 14. The generator 14 produces short 15,000 cycle modulating pulses 15 for pulse modulating the transmitter 12.

Output signal from the oscillator 13 is also passed through a phase shifter 16 and supplied to a pulse generator 17 for producing time gate pulses 18. The pulses 18 have the same repetition rate as the modulating pulses 15 and may be of substantially the same duration. Their use for obtaining directional selection will be described hereinafter.

The receiving system comprises directive receiving antennas 21 and 22 for receiving reflected pulses that have been radiated from the antennas 10 and 11, respectively. The receiving antennas 21 and 22 are mounted on the starboard wing of the airplane in the embodiment illustrated and therefore are not visible in the side view of Fig. 1. The signals from antennas 21 and 22 are supplied to the first detectors 23 and 24, respectively, where, in accordance with the present invention, they are mixed with signal from a common local oscillator 26 to produce intermediate-frequency signals, the intermediate-frequency being 50 megacycles in the example assumed. The detectors 23 and 24 may have push-pull grid circuits in the form of tuned lines having shorting bars 27 and 28, respectively. The usual bypassed cathode-biasing resistors 29 and 31 are illustrated.

The oscillator 26 comprises push-pull grid and anode circuits in the form of tuned lines 32 and 33 having shorting bars 34 and 36, respectively. A grid-leak resistor and an anode resistor are shown at 37 and 38, respectively.

In accordance with the present invention, the oscillator grid circuit 32 is coupled to the grid circuit of the detector 23, and the oscillator anode circuit 33 is coupled to the grid circuit of the detector 24. It will be noted in particular that where the grid and anode circuits of the oscillator 26 are tuned lines, this results in a mechanical arrangement of units such that the detectors 23 and 24 are spaced apart. In this way the detectors 23 and 24 are isolated with respect to each other even though they are supplied with mixing signal from an oscillator common to the two detectors. By employing a single oscillator in this way, any difficulty resulting from changes in oscillator frequency is avoided. While it is feasible to lock together two oscillators as described below so that any frequency change in one will cause a corresponding frequency change in the other, this may be difficult at frequencies in the region of 400 megacycles per second and in any event requires additional components.

The I.-F. outputs from the first detectors 23 and 24 (which outputs will differ in frequency only by the amount of the Doppler effect) are passed through I.-F. amplifiers 41 and 42 to the second detectors 43 and 44, respectively. Here the I.-F. signals are again heterodyned to a lower frequency by means of the oscillators 46 and 47 which are coupled to the detectors 43 and 44, respectively. In order to hold the oscillators 46 and 47 exactly to the same frequency, each is locked in with the other by coupling them together through a common inductance coil 48.

The I.-F. outputs of the second detectors 43 and 44 are passed through I.-F. amplifiers 49 and 51 and through amplitude limiters 52 and 53, respectively. The outputs of the limiters 52 and 53 are supplied to an auto-transformer 54 from which both outputs are supplied through a cable 56 and an amplifier 57 to a detector 58. The time gate pulses 18 are also applied to detector 58.

The two I.-F. signals from the amplifier 57 beat with each other in the detector 58 whereby the detector output has a beat frequency that is the frequency difference resulting from the Doppler effect. The gating pulses 18 allow the detector 58 to pass only the signals reflected along the desired 45 degree angle lines fore and aft.

As will be explained more fully in connection with Fig. 3, the output of detector 58 is supplied to a circuit 59 tuned to the 15,000 cycle pulse repetition rate and then passed through a rectifier 61 to obtain pulses of current occurring at the beat or Doppler frequency. The Doppler frequency pulses are then supplied to a suitable frequency indicating or counter circuit 62. The counter circuit 62 may be of the type commonly employed in radio altimeters of the frequency modulated type.

Fig. 3 shows, by way of example, a specific circuit corresponding to the blocks 20, 57, 58, 59 and 61 of Fig. 2.

The keyer tube 20 comprises a pentode having in its grid circuit an adjustable inductance coil 63 to vary the pulse width and a resistor 64 for suppressing parasitic oscillations. The cathode is positively biased beyond cut-off by means of a connection 66 to a voltage divider 67. A bypass capacitor 70 is provided. A time gate pulse 18 of negative polarity is applied through a coupling capacitor 68 to the cathode of a pentode 69 to reduce its bias to the cut-off point during the pulse interval. It therefore operates as a time gate detector because it is in operative condition (at cut-off D.-C. bias) only when the pulse is applied and is substantially beyond cut-off at all other times.

The I.-F. pulses 15' corresponding to the fore and aft reflected pulses are applied from the amplifier 57 to the control grid of the pentode 69 through a coupling capacitor 71. These pulses are reflected from the earth's surface within a wide angle as indicated in Fig. 1, rather than from only a small surface area and along the two 45 degree lines only. The grid circuit of pentode 69 includes an inductance coil 72 for providing coupling impedance, the coil 72 being shunted by a resistor 73. An oscillation suppressor resistor 74 may be provided.

In the absence of a gate pulse 18, the tube 69 is biased beyond cut-off by a positive cathode bias that is applied from the voltage divider 67 through a cathode resistor 76. Therefore, the only reflected pulses that pass through the tube 69 are those that appear on its control grid simultaneously with the appearance of a gating pulse 18 on its cathode. By adjustment of the phase shifter 16 (Fig. 1) the pulse 18 can be made to occur at the proper time to pass only those reflected pulses that have traveled a certain specific distance, this distance being that along the 45 degree line in the particular example assumed.

Since the pentode 69 is to function as a detector for obtaining the Doppler or beat frequency of the fore and aft reflections, its cathode bias and the amplitude of the gate pulses 18 are properly adjusted to make the tube 69 act as a detector during the occurrence of each pulse 18.

The beat frequency output plate current of the tube 69 is shown by the graph 76 and consists of the 15,000 cycle video pulses which vary in amplitude at the Doppler or beat frequency. These pulses are applied through a coupling capacitor 77 to the circuit 59 which is tuned to the pulse repetition rate of 15,000 cycles per second. Thus, as shown by the graph 78, there appears across the tuned circuit 59 a sine wave voltage of 15,000 cycles which varies in amplitude at the rate of the Doppler effect frequency.

The beat frequency modulated sine wave 78 is rectified by a diode or other suitable rectifier 61 whereby there appears across the output resistor 79 the rectified signal 81. The signal 81 is amplified by a triode 82 and integrated by a resistor-capacitor filter 83 to produce pulses 84 that recur at the Doppler frequency. The pulses 84 are then shaped (clipped) by a vacuum tube 86 and supplied to a suitable indicator or pulse counter 62. The above-described circuit for determining or indicating the beat frequency of the output of the detector 58 is described and claimed in co-pending application Serial No. 507,741, filed October 26, 1943, in the name of Earl I. Anderson, and entitled Ground speed indicator.

By utilizing the tuned circuit 59, a large output is obtained since the narrow pulses shown in graph 76 are converted by the tuned circuit 59 into voltage sine waves whose peak amplitude is still about as great as though a resistance load were used but whose integrated area is greater. Thus the usuable energy output from the modulated pulses is increased by the tuned circuit although the tuned circuit actually introduces the usual circuit loss.

The use of the tuned circuit 59 also improves the signal-to-noise ratio as compared with that obtained when the tuned circuit 59 is replaced by a high impedance resistor. This is because the circuit 59 has low impedance to noise or ripples on the power supply so that most of the noise voltage appears across the comparatively high impedance coupling capacitor 77.

We claim as our invention:

1. In a system for determining the speed of an object with respect to a reflecting surface, means for radiating pulses of radio energy from said object in two directions, means for receiving in two separate channels the pulses received from said two directions after reflection from said surface, a detector in each of said channels, an oscillator comprising a vacuum tube having a tuned grid circuit and a tuned anode circuit which are coupled to said detectors in the two channels, respectively, for producing intermediate-frequency signals in said two channels, and means for mixing said two intermediate frequency signals to obtain their beat frequency.

2. In a system for determining the ground speed of an aircraft, means for radiating pulses of radio energy both forwardly and rearwardly from said aircraft towards the earth's surface, means for receiving in two separate channels the pulses received from the front and from the rear after reflection from said surface, a detector in each of said channels, an oscillator comprising a vacuum tube having a grid circuit and an anode circuit, said grid and anode circuits being coupled to said two detectors, respectively, said oscillator operating at a frequency different from the carrier frequency of the received pulses for producing intermediate-frequency signals in said two channels, and means for mixing said two intermediate-frequency signals to obtain their beat frequency.

3. In a system for determining the ground speed of an aircraft, means for radiating pulses of radio energy from said aircraft in two directions towards the earth's surface, means for receiving in two separate channels the pulses received from said two directions after reflection from said surface, a detector in each of said channels, an oscillator comprising a vacuum tube having a grid circuit comprising a tuned line and an anode circuit comprising a second tuned line, said tuned lines being coupled to said two detectors, respectively, said oscillator operating at a frequency different from the carrier frequency of the received pulses for producing intermediate-frequency signals in said two channels, and means for mixing said two intermediate-frequency signals to obtain their beat frequency.

4. In a system for determining the ground speed of an aircraft, means for radiating pulses of radio energy from said aircraft in two directions towards the earth's surface, means for receiving in two separate channels the pulses received from said two directions after reflection from said surface, a detector in each of said channels, each detector including a tuned line, an oscillator comprising a vacuum tube having a grid circuit comprising a tuned line and an anode circuit comprising a second tuned line, said tuned lines being coupled to the tuned lines of said two detectors, respectively, said oscillator operating at a frequency different from the carrier frequency of the received pulses for producing intermediate-frequency signals in said two channels, and means for mixing said two intermediate-frequency signals to obtain their beat frequency.

5. In a system for determining the speed of an object with respect to a reflecting surface, means for radiating pulses of radio energy from said object in two directions, means for receiving in two separate channels the pulses received from said two directions after reflection from said surface, a detector in each of said channels, an oscillator comprising a vacuum tube having a tuned grid circuit and a tuned anode circuit which are coupled to said detectors in the two channels, respectively, for producing intermediate-frequency signals in said two channels, and heterodyne means for reducing the frequency of said intermediate-frequency signals to signals of a lower frequency, and means for mixing said two lower-frequency signals to obtain their beat frequency.

EARL I. ANDERSON.
ALLEN BARCO.